United States Patent [19]

Minai

[11] Patent Number: 5,193,881
[45] Date of Patent: Mar. 16, 1993

[54] STRUCTURE OF BACK BOARD FOR VEHICLE SEAT

[75] Inventor: Masamitsu Minai, Akishima, Japan

[73] Assignee: Tachi-S Co., Ltd., Akishima, Japan

[21] Appl. No.: 780,361

[22] Filed: Oct. 22, 1991

[51] Int. Cl.⁵ .............................................. A47C 7/02
[52] U.S. Cl. .................................................... 297/452
[58] Field of Search ................ 297/452, 440, 444, 457

[56] References Cited

U.S. PATENT DOCUMENTS

| | | | |
|---|---|---|---|
| 4,580,837 | 4/1986 | Bayley | 297/452 X |
| 4,588,228 | 5/1986 | Nemoto | 297/452 |
| 4,746,168 | 5/1988 | Bracesco | 297/444 X |
| 4,796,954 | 1/1989 | Saito | 297/452 |
| 4,909,572 | 3/1990 | Kanai | 297/452 |
| 5,000,512 | 3/1991 | Laird | 297/440 |
| 5,048,894 | 9/1991 | Miyajima et al. | 297/452 X |
| 5,064,247 | 11/1991 | Clark et al. | 297/452 X |

Primary Examiner—Kenneth J. Dorner
Assistant Examiner—Milton Nelson, Jr.
Attorney, Agent, or Firm—Oldham Oldham & Wilson Co.

[57] ABSTRACT

A back board structure for a vehicle seat of the type having a slit through which a lower arm of the reclining device passes, where there is a bracket together with an elastic cover member around the slit of the back board, to reinforce the slit area and close the slit against coming into view from the outside.

5 Claims, 3 Drawing Sheets

PRIOR ART

STRUCTURE OF BACK BOARD FOR VEHICLE SEAT

BACKGROUND OF THE INVENTION

1. Field of the Invention

The present invention relates to a back board attached on the back side of a vehicle seat such as an automotive seat, and in particular to a back board of this kind whose end is formed with a slit through which a lower arm of a reclining device is inserted.

2. Description of Prior Art

FIG. 1 shows an example of a conventional back board (1) attached to an automotive seat. The back board (1), which is made of a synthetic resin material, is formed at its lower part with a pair of slits (11)(11) through which a lower arm (5) of a reclining device (R) projects outwardly, the reclining device (R) being fixed at the seat cushion (SC), whereby the lower arm (5) is free of contact with the back board (1) irrespective of the seat back (SB) being inclined forwardly and backwardly relative to the seat cushion (SC). Designation (6) denotes an upper arm whose lower end is pivotally connected to the lower arm (5) and whose upper end is fixed to the seat back (SB) Designation (1a) denotes a central board portion of the back board (1), and designation (1b) denotes a lateral board portion thereof.

The slits (11)(11) are each formed at the respective lower end parts of left and right corners of the back board (1), such that each slit (11) extends upwardly from such lower end. Consequently, due to the slits (11)(11), the back board (1) per se is less rigid in structure, and thus easier to be deformed at its lower lateral part, which may be contacted with a center protrudent console part of automobile cabin or make exposed some internal parts of the reclining device into view, thus resulting in a poor outer appearance of the seat.

SUMMARY OF THE INVENTION

In view of the above shortcoming of prior art, it is thus a purpose of the present invention to provide an improved structure of back board for a vehicle seat which increases a rigidity at both lower end portions where the slits in question exist.

To achieve such purpose, according to the present invention, a rigid bracket is provided such as to surround each of the slits by means of securing screws, whereby the area adjacent to the slits is reinforced against deformation, presenting an effective solution to the above-discussed problems.

It is another purpose of the present invention to conceal the interior of back board in order to prevent same from being viewed through the slits from outside.

To this end, a cover member is juxtaposed with and secured to the inner surface of the bracket by way of securing pawls formed in the bracket, to place the slits in a closed state. The cover member may be made of a rubber material or the like, preverably with an incision being provided to allow passing of the reclining device lower arm therealong, which will be more effective for concealing the interior of the back board. Hence, the slits are covered with such cover member, irrespective of the vertical motion of reclining device lower arm therein. Accordingly, the interior of the back board is prevented from being viewed through the slits from outside by virtue of such elastic curtain effect of cover member.

DETAILED DESCRIPTION OF THE PREFERRED EMBODIMENTS OF THE INVENTION

Figure 2:
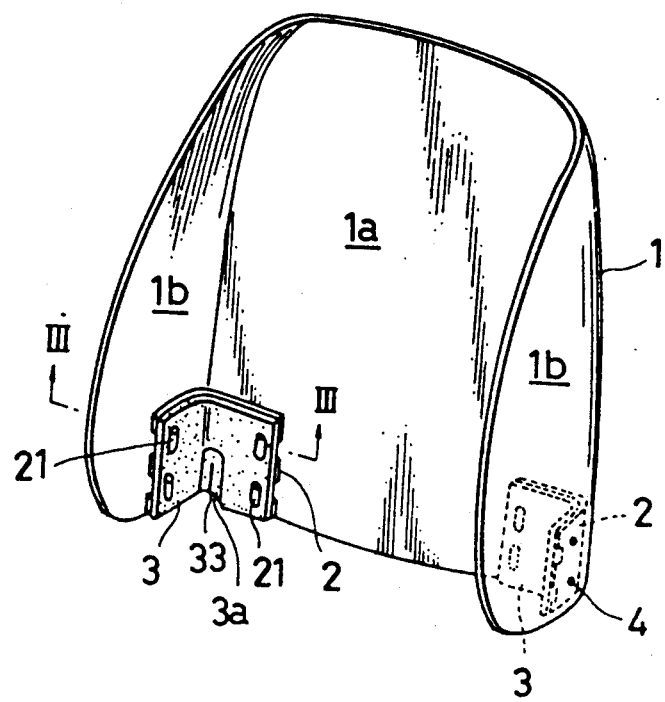
FIG. 2 is a perspective view of a back board in accordance the present invention.

FIG. 2 illustrates a structure in accordance with the present invention, which is applied to the conventional back board (1) mentioned previously, it should then be understood that all like designations in the prior art description correspond to all like designations in the present description.

Referring to FIGS. 2 through 5, according to the structure of back board in the present invention, there are provided a pair of generally L-shaped rigid brackets (2)(2), and a pair of elastic cover members (3)(3), both of which are juxtaposed with each other as will be explained later for particular purposes.

The two brackets (2)(2) are made of a metallic plate or the like, and are formed into such L-shaped configuration which conforms to the inner corner surface of the back board (1). Both lateral edges of each bracket (2) are each provided with a pair of vertically spaced-apart securing lugs (21)(21) which are formed by punching out the corresponding parts of bracket (2) in a direction inwardly thereof, so that the lugs project from the inner surface of the bracket. As shown, the free end parts respectively of the lugs (21)(21) are each bent such as to constitute the lugs as securing pawls for positively securing the cover members (3)(3), which will become apparent later. At the lower area of corner in each bracket (2), a cut-away slit-like portion (23) is formed such that it extends vertically along the vertical line of that corner of bracket (2), with a dimensions identical to the respective slits (11) of back board (1). The bracket (2) has plural holes (22) formed at suitable points therein, but their locations should be aligned with another plural holes (11a) formed at the lower corner area of back board (1) in the neighborhood of the slit (1). For, as can be seen from FIG. 4, plural securing screws (4) are inserted through the holes (22) and fixed threadedly in the holes (11a).

The cover members (3) are each preferably made of a rubber or other soft synthetic resin material, and formed in a shape generally corresponding to the respective brackets (2). In each of cover members (3), both lateral end portions thereof are each formed with a pair of vertical spaced-apart holes (31) which are disposed at locations corresponding to the foregoing respective securing pawls (21) of bracket (2), and further, centrally of the cover member (3), a vertically rectilinear incision (33) is defined, with an outwardly stepped-out area (3a) surrounding the same. The incision (33) is, otherwise stated, formed in such stepped-out area (3a) which is formed in such a manner as to be projected outwardly of the cover member (3), as understandable from FIG. 3, having a configuration to be fitted through the bracket cut-away portion (23) as well as the slit (11) of back board (1).

Figure 3:
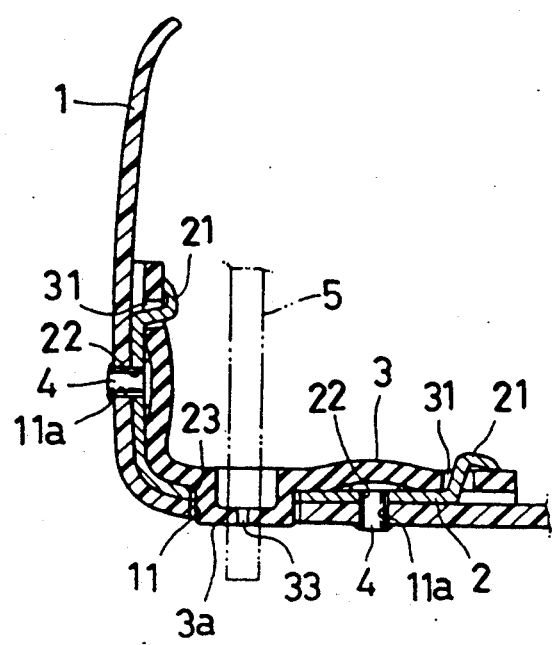
FIG. 3 is a sectional view taken along the line III—III in FIG. 2.
Figure 4:
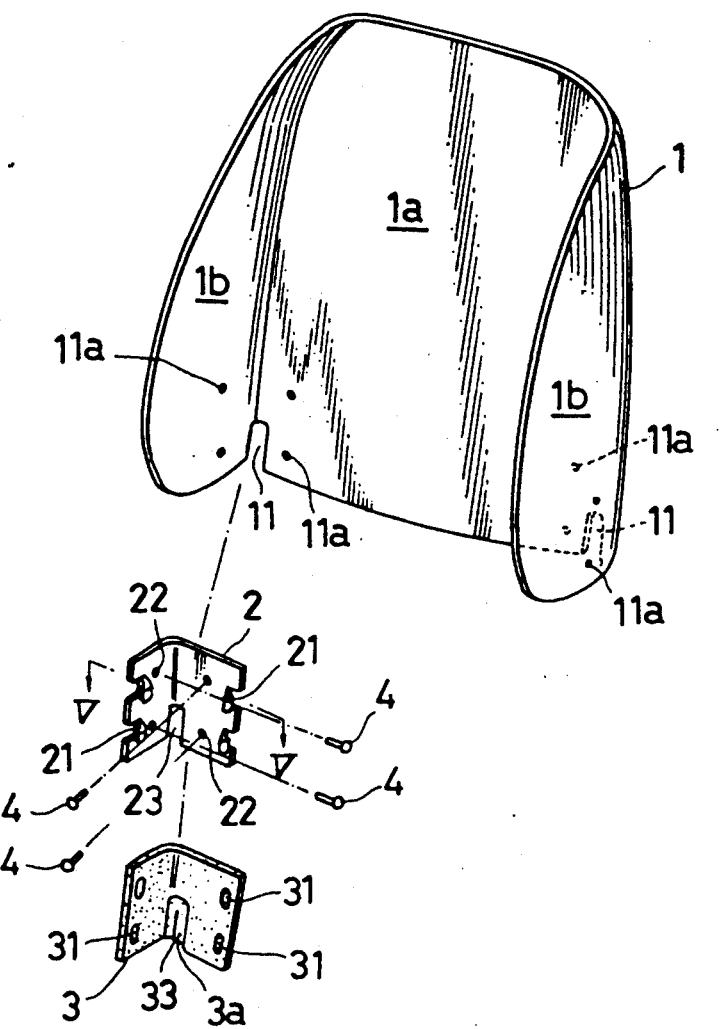
FIG. 4 is an exploded, perspective view of the back board.
Figure 5:
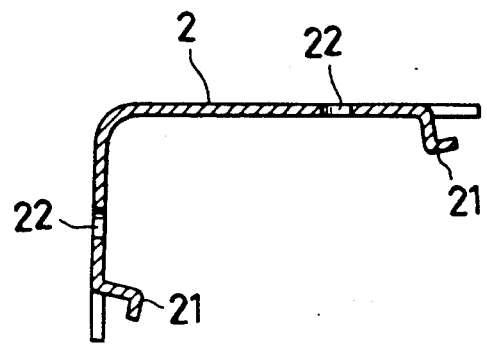
FIG. 5 is a sectional view taken along the line V—V in the FIG. 4.

Accordingly, as seen in FIGS. 3 and 4, the bracket (2) is fixed to the given lower corner portion of back board (1) by means of screws (4), and then the cover member (3) is fastened to the bracket (2) by way of engaging the holes (31) of cover member (3) over the securing pawls (21) of bracket (2), respectively, with the stepped-out area (3a) of cover member (3) being fitted in both cut-away portion (23) and slit (11). In this way, the incision (33) is positioned within the slit (11), and the slit (11) per se is closed by the cover member (3) at the incision (33) thereof. The resultant state of assembled back board is shown in FIG. 2, and thus, the left and right lower corners of back board (1) are reinforced by the brackets (2), with the slits (11) there being closed by the cover member (3) against view from outside.

Figure 1:
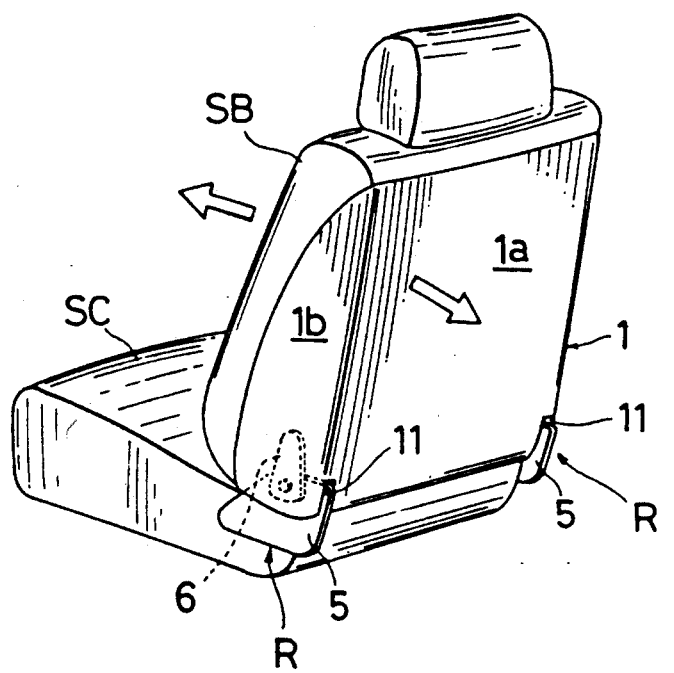
FIG. 1 is a perspective view of a rear side of an automotive seat, with a back board provided there with, of a type.

With the above-described structure, when the back board (1) is attached over the back side of seat as shown in FIG. 1, the lower arm (5) of reclining device passes party-way through the cover member incision (33) as can be seen from the phantom line in FIG. 3. Accordingly, according to the back board structure in the present invention, the lower corner area of back board (1) where the slit (11) lies is rendered rigid or robust by virtue of bracket (2) against deformation, thus solving the problems as stated in the prior art description, and the elastic nature of incision (33) in the cover member (3) causes the incision itself to cover the lower arm (5) closely so that the slit (11) is almost completely closed to thereby prevent the interior of back board from coming into view from outside.

The present invention is not limited to the illustrated embodiment, and but any other replacements, modifications, and additions may structurally be possible without departing from the scopes and spirits of the appended claims.

What is claimed is:

1. A structure of a back board for a vehicle seat, in which said seat is provided with a reclining device and said back board is attached over a back side of said seat, said back board being formed at its lower end part with a slit which permits a lower arm of said reclining device to be movable therethrough, said structure comprising:
    a rigid bracket which is secured to an inner surface of said back board at a point adjacent to said slit, thereby reinforcing said back board adjacent to said slit;
    said rigid bracket being formed with a projected engagement means; and
    an elastic cover member which is secured to said rigid bracket by being engaged with said projected engagement means, such as to cover both said slit and said lower arm of said reclining device, whereby said slit is substantially closed to prevent an interior of back board from coming into view from the outside.

2. The structure as defined in claim 1, wherein said rigid bracket is formed with a cut-away portion whose configuration conforms so that of said slit of said back board, thereby permitting said lower arm of said reclining device to pass also through said bracket.

3. The structure as defined in claim 1, wherein said elastic cover member is formed with an incision, and wherein said incision is disposed at a location corresponding to said slit of said back board, whereby said reclining device lower arm passes through said incision and further is covered closely thereby due to an elastic nature of said cover member.

4. A structure of a back board for a vehicle seat, in which said seat is provided with a reclining device and said back board is attached over a backside of said seat, said back board being formed at its lower end part with a slit through which a lower arm of said reclining device passes, said structure comprising:
    a rigid bracket which is secured to an inner surface of said back board at a point adjacent of said slit;
    said rigid bracket being formed with a projected engagement means; and
    an elastic cover member which is secured to said rigid bracket by being engaged with said projected engagement means, so as to cover said lower arm of said reclining device,
    wherein said rigid bracket is formed with a cut-away portion whose configuration conforms to that of said slit of said back board, thereby permitting said lower arm of said reclining device to pass also through said bracket, wherein said elastic cover member is formed with an incision, wherein said incision is disposed at a location corresponding to said slit of said back board, so that said reclining device lower arm passes through said incision and further is covered closely thereby due to an elastic nature of said cover member, wherein said cover member is formed with an outwardly stepped-out portion, wherein said stepped-out portion is defined as a point corresponding to said slit, having a configuration to be fitted in said slit, wherein said incision is defined within said stepped-out portion, and wherein said stepped-out portion of said cover member is fitted in both of said bracket cut-away portion and back board slit.

5. A structure of a back board for a vehicle seat, in which said seat is provided with a reclining device and said back board is attached over a back side of said seat, said back board being formed at it lower end part with a slit through which a lower arm of said reclining device passes, said structure comprising:
    a rigid bracket which is secured to an inner surface of said back board at a point adjacent of said slit;
    said rigid bracket being formed with a projected engagement means; and
    an elastic cover member which is secured to said rigid bracket by being engaged with said projected engagement means, so as to cover said lower arm of said reclining device,
    wherein said projected engagement means comprises at least one securing pawl which is formed by punching out a corresponding part of said bracket in a direction inwardly thereof, so that said securing pawl projects inwardly of said bracket, and wherein said cover member is formed with at least one hole through which said securing pawl is inserted, whereby said cover member is firmly secured to an inner surface of said bracket.

* * * * *